US005524905A

United States Patent [19]
Thoman et al.

[11] Patent Number: 5,524,905
[45] Date of Patent: Jun. 11, 1996

[54] SEALING ASSEMBLY WITH T-SHAPED SEAL RING AND ANTI-EXTRUSION RINGS

[75] Inventors: Richard Thoman, Perkasie; Vinay Nilkanth, Souderton, both of Pa.

[73] Assignee: Greene, Tweed of Delaware, Inc., Wilmington, Del.

[21] Appl. No.: 314,022

[22] Filed: Sep. 28, 1994

[51] Int. Cl.$^6$ ............................................ F16J 15/32
[52] U.S. Cl. ........................... 277/188 A; 277/188 R
[58] Field of Search ........................... 277/152, 165, 277/177, 188 A, 188 R

[56] References Cited

U.S. PATENT DOCUMENTS

| | | | |
|---|---|---|---|
| 2,349,170 | 5/1944 | Jackman . | |
| 2,797,971 | 7/1957 | Greenough | 277/188 A |
| 3,188,099 | 6/1965 | Johnson et al. | 277/188 A |
| 3,473,814 | 10/1969 | Bastow | 277/188 A |
| 3,582,093 | 6/1971 | Lucien | 277/188 A |
| 3,582,094 | 6/1971 | Whittaker | 277/188 |
| 3,771,801 | 11/1973 | Burke | 277/188 |
| 4,059,280 | 11/1977 | Eastwood | 277/188 A |
| 4,352,498 | 10/1982 | Burke et al. | 277/188 A |

FOREIGN PATENT DOCUMENTS

| | | | |
|---|---|---|---|
| 2604235 | 3/1988 | France | 277/188 A |
| 1288665 | 9/1972 | United Kingdom | 277/188 A |

OTHER PUBLICATIONS

Shamban Industrial Catalog, pp. 1–5, at least as early as May of 1988.

*Primary Examiner*—Scott W. Cummings
*Attorney, Agent, or Firm*—Panitch Schwarze Jacobs & Nadel

[57] ABSTRACT

A sealing assembly for sealing a clearance space between first and second members wherein the first member has a groove therein and the second member has a surface overlying the groove. The groove is defined by a base surface and two side surfaces. The first and second members are displaceable with respect to each other. The seal assembly includes a flexible generally annular sealing ring, generally T-shaped in cross section for being positioned within the groove. The ring has an axially extending leg intersecting a radially extending leg. The axially extending leg is for being positioned in engagement with the base surface of the groove. The radially extending leg includes converging side surfaces merging into converging end surfaces. The end surfaces are generally linear in cross section and merge into a generally arcuate transition surface when the ring is in an uncompressed state. The transition surface and at least a portion of the end surfaces are in facing engagement with the surface of the second member when the ring is in a compressed state. A complementary mating anti-extrusion ring is positioned within the groove juxtaposed to each side surface and the radially extending leg.

12 Claims, 3 Drawing Sheets

5,524,905

SEALING ASSEMBLY WITH T-SHAPED SEAL RING AND ANTI-EXTRUSION RINGS

FIELD OF THE INVENTION

The present invention relates to a sealing assembly and, more particularly, to a sealing assembly for sealing a clearance space between first and second relatively displaceable surfaces.

BACKGROUND OF THE INVENTION

The use of sealing assemblies which include a T-shaped sealing ring and a pair of back-up or anti-extrusion rings to form a seal between two relatively movable members is generally known. Such sealing assemblies are often used in hydraulic or pneumatic systems for both rod and piston-type seals. The application of T-shaped sealing assemblies to some of these systems has resulted in significant performance advantages over O-ring seal configurations.

U.S. Pat. No. 3,582,094 (hereafter "the '094 patent") discloses a conventional sealing assembly which significantly improved upon the standard O-ring seal configurations. Although the sealing assemblies disclosed in the '094 patent significantly improved upon conventional O-ring seal configurations and perform satisfactorily for most applications, there have been documented isolated instances where the conventional T-shaped seal assemblies have failed in certain relatively high-pressure applications due to resilient tensile stress concentrations from frictional drag yielding degradation of the downstream side of the T-shaped sealing ring. That is, on the atmospheric side of the T-shaped sealing ring, a crack forms in the general area where the radially extending leg intersects the axially extending leg. The crack extends circumferentially around the ring, but not necessarily the full 360°. With dynamic, pressurized activation, the crack then propagates into the body of the elastomeric stem. At some undetermined depth, the crack then exercises open and closed, in such a manner, that segments of rubber break free from the crack edge. This systematic separation of the rubber propagates into a circular pock-mark appearance. In time, the loss of material contaminates the sealing surface which reduces the sealing efficiency. This loss of material also reduces the column strength of the radially extending leg which supports the dynamic crown. As the crown collapses, the radial vector forces are reduced to reduce the compressive sealing stress and results in seal leakage.

In relatively high-pressure applications wherein high performance is required, even isolated instances of failure can be problematic. Thus, a need has arisen for a seal assembly which does not result in pock marks in the area where the radially extending leg intersects the axially extending leg during high-pressure operation.

One seal assembly which attempts to overcome this problem is disclosed in U.S. Pat. No. 3,771,801 (hereafter "the '801 patent"). This seal assembly includes converging side surfaces along the radially extending leg. While the converging side surfaces assist in preventing pock marks in the area where the radially extending leg intersects with the axially extending leg, the seal assembly disclosed in the '801 patent has not provided an effective seal between the first and second members. That is, because of insufficient force applied to the crown and only a small portion of the crown contacting the surface opposed to the groove, during high pressure, the distal end of the radially extending leg achieves rocking motion which results in loss of contact and yields leakage due to the instability. Hence, a need has arisen for a seal assembly which maintains good contact between the first and second members and does not degrade in the area where the radially extending leg intersects the axially extending leg.

The present invention is directed to a seal assembly for sealing a clearance space between first and second relatively displaceable members. The sealing ring of the present invention is generally T-shaped in cross section and includes converging side surfaces on the radially extending leg to prevent pock marks from forming in the area between the radially extending leg and the axially extending leg. The crown of the radially extending leg includes a generally arcuate transition surface in sufficient facing sealed engagement with one of the members to prevent leakage. Accordingly, the sealing assembly of the present invention has a longer life than the seal assemblies of the prior art.

SUMMARY OF THE INVENTION

Briefly stated, the present invention relates to a sealing assembly for sealing a clearance space between a first surface of a first member and a second surface of a second member. The first member has a groove therein and the second surface of the second member overlies the groove. The first and second members are displaceable with respect to each other. The groove is defined by a base surface and two side surfaces. The seal assembly includes a flexible generally annular sealing ring for being positioned within the groove. The ring has a radially extending leg and an axially extending leg for being positioned in engagement with the base surface. The radially extending leg intersects the axially extending leg and includes side surfaces merging into converging end surfaces. One of the side surfaces converges into one of the converging end surfaces. The end surfaces are generally linear in cross section and merge into a generally arcuate transition surface when the ring is in an uncompressed state. The transition surface and at least a portion of the end surfaces are in facing engagement with the second surface of the second member when the ring is in a compressed state. A complementary mating anti-extrusion ring for being positioned within the groove is juxtaposed to each side surface and the radially extending leg.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements, configurations and instrumentalities shown. In the drawings.

DETAILED DESCRIPTION OF PREFERRED EMBODIMENTS

Figure 1:
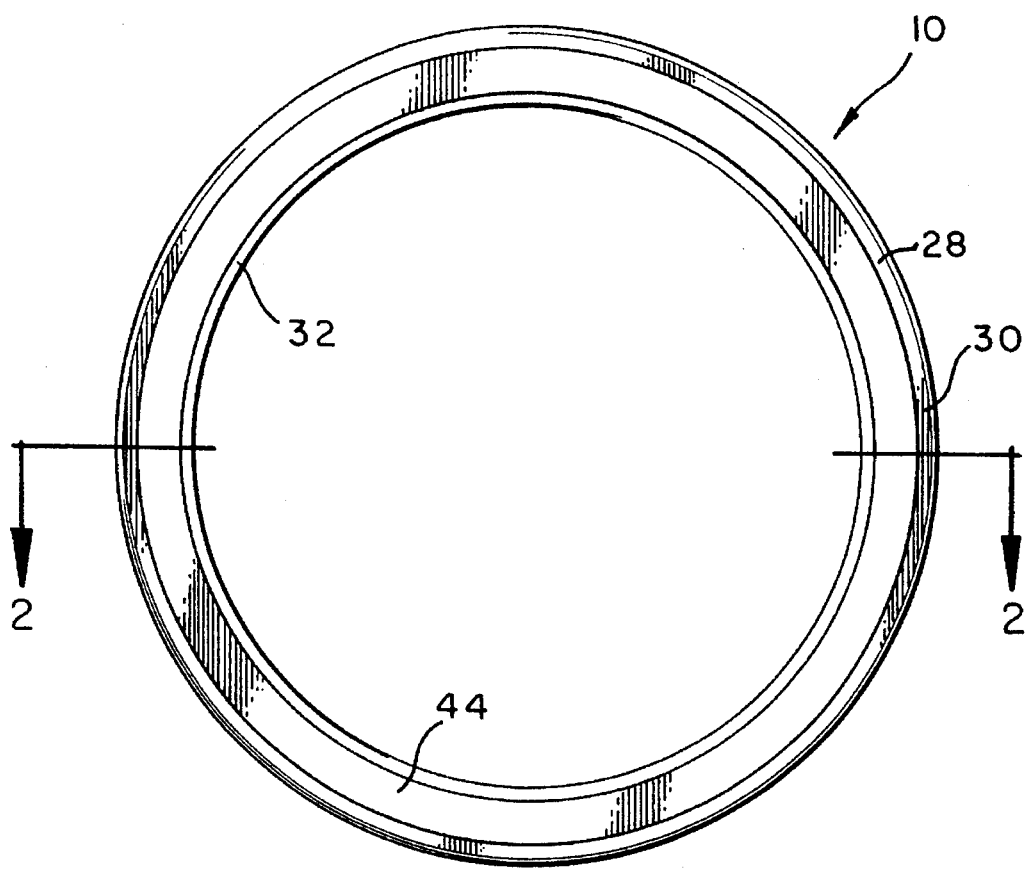
FIG. 1 is an elevational view of a sealing assembly in accordance with a first preferred embodiment of the present invention.

Certain terminology is used in the following description for convenience only and is not limiting. The words "right," "left" "lower" and "upper" designate, directions in the drawings to which reference is made. The words "inwardly" and "outwardly" refer to directions toward and away from, respectively, the geometric center of the sealing assembly and designated parts thereof. The terminology includes the words above specifically mentioned, derivatives thereof and words of similar import.

Figure 2:
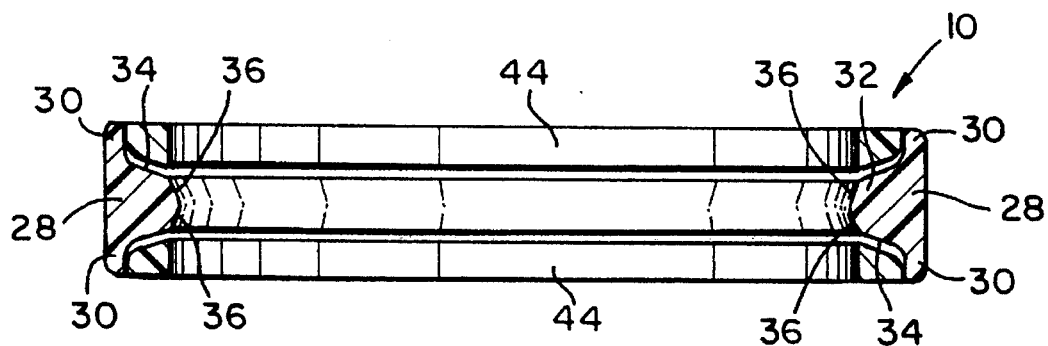
FIG. 2 is a cross-sectional view of the sealing assembly shown in FIG. 1 taken along lines 2—2 of FIG. 1.
Figure 3:
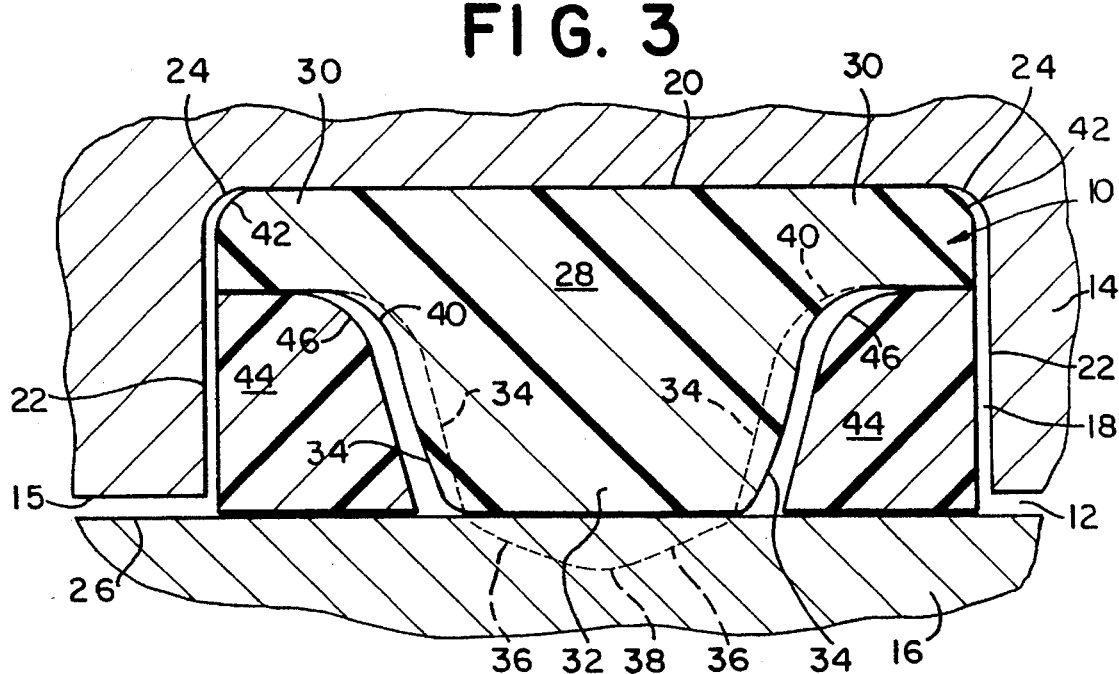
FIG. 3 is a greatly enlarged cross-sectional view of the sealing assembly shown in FIG. 1 positioned between first and second members.

Referring now to the drawings in detail, wherein like numerals are used to indicate like elements throughout, there is shown in FIGS. 1 through 3 a sealing assembly, generally designated 10, in accordance with a first preferred embodiment of the present invention. As shown in FIG. 3, the sealing assembly 10 is used for sealing a clearance space 12 between first and second members 14, 16, respectively. The first member 14 has a first surface 15 and a generally annular groove 18 therein. The groove 18 is defined by a base surface 20 and two side surfaces 22. As shown in FIG. 3, the groove 18 is generally rectangular in cross section and the side surfaces 22 extend generally perpendicularly from the base surface 20. A generally arcuate transition area 24 extends between the side surfaces 22 and the base surface 20.

The second member 16 includes a second surface 26 which overlies the groove 18. The first and second members 14, 16 are preferably displaceable with respect to each other. That is, it is preferred that the first and second members 14, 16 be axially displaceable with respect to each other and that the second surface 26 define a generally cylindrical opening and the first member 14 define a generally cylindrical complementary shape which is slidably disposed within the opening defined by the second surface 26 of the second member 16. Examples of typical first and second members 14, 16 include a cylinder (second member) and piston (first member). However, it is understood by those skilled in the art that the groove 18 could face radially inwardly and the second surface 26 face radially outwardly without departing from the spirit and scope of the invention.

Referring now to FIGS. 2 and 3, the sealing assembly 10 includes a flexible generally annular sealing ring 28, generally T-shaped in cross section, for being positioned within the groove 18. The sealing ring 28 has an axially extending leg 30 and a radially extending leg 32 intersecting the axially extending leg 30. As best shown in FIG. 3, the axially extending leg 30 is positioned in engagement with the base surface 20. As such, the radially extending leg 32 extends generally perpendicularly with respect to the base surface 20. The radially extending leg 32 includes converging side surfaces 34 merging into converging end surfaces 36.

The converging side surfaces 34 extend from the axially extending leg 30 at an angle of about ten to sixty degrees and preferably at an angle of about fifteen degrees from a line drawn perpendicular to the radially extending leg 30. The converging side surfaces 34 support the radially extending leg 32 thereby preventing the converging end surfaces 36 from rotating and rocking with respect to the second surface 26 which caused the stress concentrations in the prior sealing devices discussed above. As a result of the design of the converging end surfaces 36 and the transition surface 38 the contacting surface area between the radially extending leg 32 and the second surface 26 yields a relatively lower friction drag and reduced leakage of lubricant as compared to the prior art sealing devices discussed above.

The converging side surfaces 34 arcuately merge into the converging end surfaces 36. The converging end surfaces 36 are generally linear in cross section and merge into a generally arcuate transition surface 38 when the sealing ring 28 is in an uncompressed state, as shown in phantom in FIG. 3. The converging end surfaces 36 extend from the converging side surfaces 34 at an angle of about ten to sixty degrees and preferably about twenty-three degrees from a line drawn parallel to the second surface 26. The transition surface 38 and at least a portion of the converging end surfaces 36 are in facing engagement with the second surface 26 of the second member 16 when the sealing ring 28 is in a compressed state, as shown in solid lines in FIG. 3. That is, the sealing ring 28 assumes the position shown in phantom in FIG. 3 prior to placing the seal assembly 10 within the groove 18 between the first and second members 14, 16. After the seal assembly 10 is positioned within the groove 18, and the first member 14 is in position within the second member 16, the radially extending leg 32 of the sealing ring 28 is compressed such that the transition surface 38 and at least a portion of the converging end surfaces 36 are in substantial facing engagement with the second surface 26 to provide a relatively large contact area and a good seal.

As shown in FIG. 3, in the first preferred embodiment, it is preferred that the sealing ring 28 include generally arcuate transition surfaces 40 between the converging side surfaces 34 and the axially extending leg 30. Similarly, the axially extending leg 30 includes complementary transition areas 42 which meet with the transition areas 24 of the groove 18. However, the transition areas 42 of the axially extending leg 30 and the transition areas 24 of the groove 18 could be formed in other complementary manners. For instance, the transition areas 42, 24 could be orthogonally complementary without departing from the spirit and scope of the invention.

In the first preferred embodiment, it is preferred that the sealing ring 28 be constructed of a flexible resilient material which is capable of recovering its size and shape after deformation, such as an elastomeric material and preferably nitrile. However, it is understood by those skilled in the art that the sealing ring 28 could be constructed of other flexible materials, such as fluoro elastomers, ethylene-propylene and other synthetic elastomeric materials of any type which are useful for the particular type of application. Selection of a suitable material is well within the capabilities of one skilled in the art.

While in the present embodiment it is preferred that the sealing ring 28 be generally T-shaped, it is also understood by those skilled in the art that the sealing ring 28 could be configured in other manners, such as L-shaped, so long as there is sufficient contact area between the radially extending leg 32 and the second surface 26 of the second member 16 and one of the side surfaces would be converging so that the material does not experience unsuitably high stress concentrations which would result in pock marks in the sealing ring 28.

Referring now to FIG. 3, a complementary mating anti-extrusion ring 44 is positioned within the groove 18 juxtaposed to each converging side surface 34 of the radially extending leg 32. The outer peripheral surfaces of the anti-extrusion rings 44 are preferably flat for engagement with the side surfaces 22 of the groove 18, as well as the second surface 26 of the second member 16. Under pressure, the anti-extrusion rings 44 are pressed against the side surface 22 and second surface 26, sealing off the clearance space 12 between the second surface 26 and first surface 15, thus preventing extrusion of the radially extending leg 32 into the clearance space 12. The portions 46 of the anti-extrusion rings 44 which face the transition surfaces 40 of the sealing ring 28 are formed to be generally complementarily arcuate with the transition surfaces 40 to provide for an even distribution of the force supplied by the sealing ring 28 against either of the anti-extrusion rings 44 when the sealing ring 28 is deformed by the application of pressure in the clearance space 12.

The anti-extrusion rings 44 are preferably constructed of non-resilient, non-extrudable materials used in sealing assemblies of the T-ring or L-ring type, including polytetrafluoroethylene, polyetheretherketone, phenolic, polyamides, bronze and variations of these materials. Selection of appropriate non-extrudable materials depends upon the application for the sealing assembly, the size and character of the machine elements being sealed, the fluid against which the leakage protection is desired. Further, the temperature, pressure, surface finish, speed and direction of motion and other pertinent conditions will dictate the kinds of materials to be employed in the sealing assembly 10 of the present invention.

In operation, when fluid pressure is applied to the first and second members 14, 16 through the clearance space 12, the sealing ring 28 becomes deformed. Material of the sealing ring 28 is caused to flow from the portion of the axially extending leg 30 on one side of the radially extending leg 30 to the radially extending leg 32 and from the radially extending leg 32 to the portion of the axially extending leg 30 on the other side of the radially extending leg 32. This flowing of material causes the portion of the axially extending leg 30 on the other side of the radially extending leg 32 to thicken in a radial direction. The thickening of this portion of the axially extending leg 30 urges the anti-extrusion ring 44 on that side into contact with the second surface 26 to prevent extrusion of material from the radially extending leg 32 into the clearance space 12 and allows the transition surface 38 and at least a portion of the converging end surfaces 36 to achieve substantial facing engagement with the second surface 26 to provide a relatively large contact area and a good seal. In a double-acting application, the application of pressure is then applied in the opposite direction to achieve sealing along the other anti-extrusion ring 44. As such, in the double-acting installation, the sealing assembly 10 is subjected to a change in force pattern, and undergoes more or less continuous alterations in configuration during operation. In a single-acting application, pressure is applied either continuously or intermittently. For intermittent application, the sealing ring 28 also undergoes more or less continuous alterations in configuration.

At the time the second member 16 begins to move with respect to the first member 14, friction is applied between the transition surface 38 and the converging end surfaces 36 to cause the radially extending leg 32 to rotate counterclockwise and cause fluid on the downstream side of the radially extending leg 32 to be forced between the converging end surfaces 36 and the second surface 26 to lubricate the transition surface 38 and converging end surfaces 36. This lubricant is then stored on the upstream side of the radially extending leg 32. When the second member 16 reverses its direction with respect to the first member 14, the opposite occurs, resulting in replenishment of the lubricant on the downstream side of the radially extending leg 32. This results in increasing the overall life of the seal assembly 10. Furthermore, the rounding of the corners between the converging side surfaces 34 and the converging end surfaces 36 prevents nibbling of the radially extending leg 32 between the antiextrusion rings 44 and the second surface 26 to also contribute to the long-lasting life of the seal assembly 10.

Figure 4:
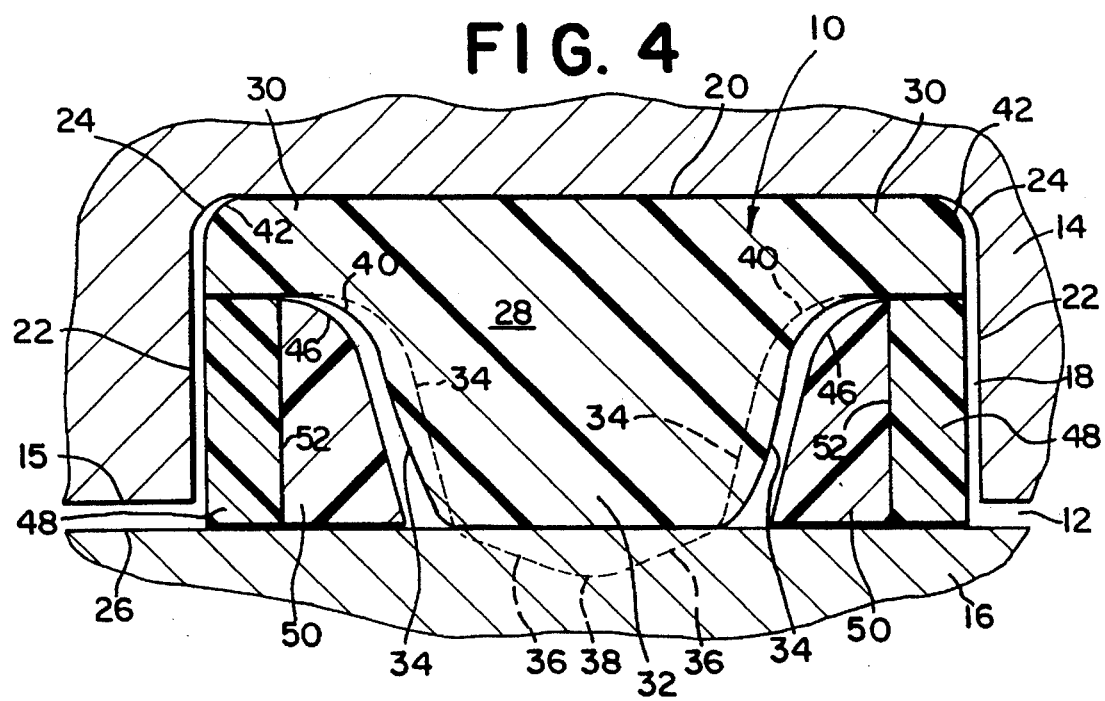
FIG. 4 is a greatly enlarged cross-sectional view of a sealing assembly in accordance with a second preferred embodiment of the present invention positioned between first and second members.

Referring now to FIG. 4, there is shown a second preferred embodiment of a sealing assembly 10 in accordance with the present invention. The second preferred embodiment of the sealing assembly 10 is generally identical to the first preferred embodiment of the sealing assembly 10 described above, except that the anti-extrusion rings 44 are each comprised of an outboard ring 48 and an inboard ring 50. The inboard rings 50 are preferably positioned between the radially extending leg 32 and the outboard rings 48. In the second preferred embodiment, it is preferred that the outboard rings 48 be constructed of a first material having a first modulus of elasticity, and that the inboard rings 50 be constructed of a second material having a second modulus of elasticity. Preferably, the first modulus of elasticity is greater than the second modulus of elasticity. For instance, the outboard rings 48 could be constructed of a relatively hard material, such as polyamides, and the inboard rings 50 could be constructed of a relatively softer material, such as polytetrafluoroethylene. Preferably, the inboard and outboard rings 50, 48 are formed to complementarily match along a line 52 formed between the two mating surfaces so that there is no gap into which the flexible material of the sealing ring 28 can extrude. The operation of the sealing assembly 10 of the second preferred embodiment is generally identical to that described above in connection with the first preferred embodiment of the sealing assembly 10.

Figure 5:
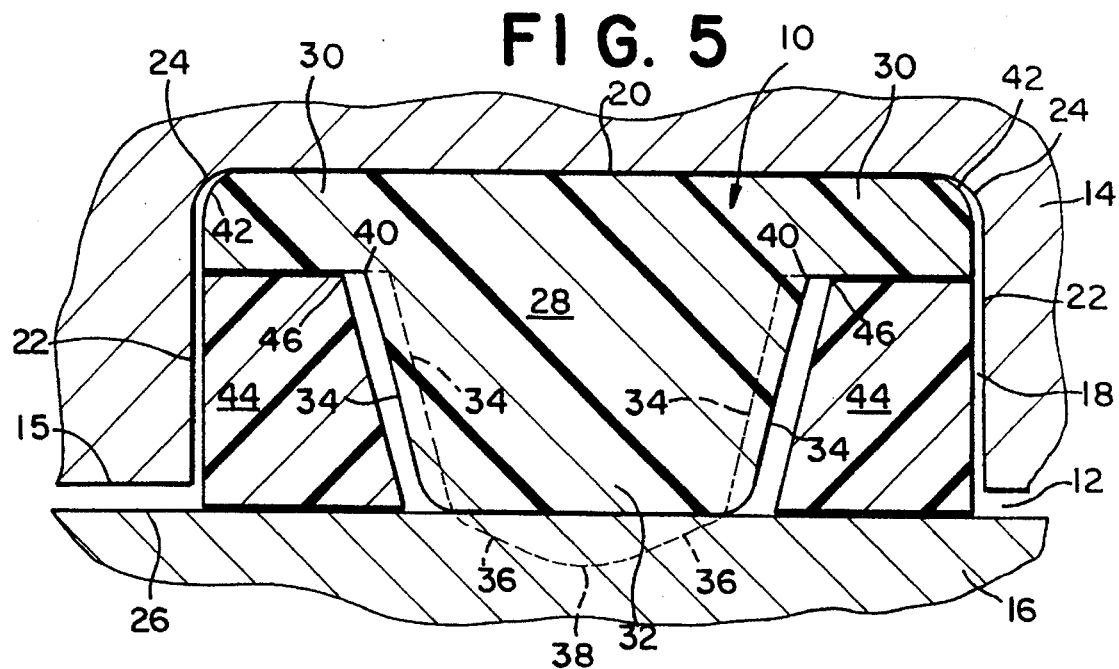
FIG. 5 is a greatly enlarged cross-sectional view of a sealing assembly in accordance with a third preferred embodiment of the present invention positioned between first and second members.

Referring now to FIG. 5, there is shown a third preferred embodiment of a sealing assembly 10 in accordance with the present invention. In the third preferred embodiment, the sealing assembly 10 is generally identical to the sealing assembly 10 discussed above in connection with the first preferred embodiment, except that the transition surfaces 40 and the complementary portion 46 on the anti-extrusion ring 44 are not arcuate, but are formed by relatively acute corners. The operation of the sealing assembly 10 in accordance with the third preferred embodiment is generally identical to the operation of the sealing assembly 10 described above in connection with the first preferred embodiment.

Figure 6:
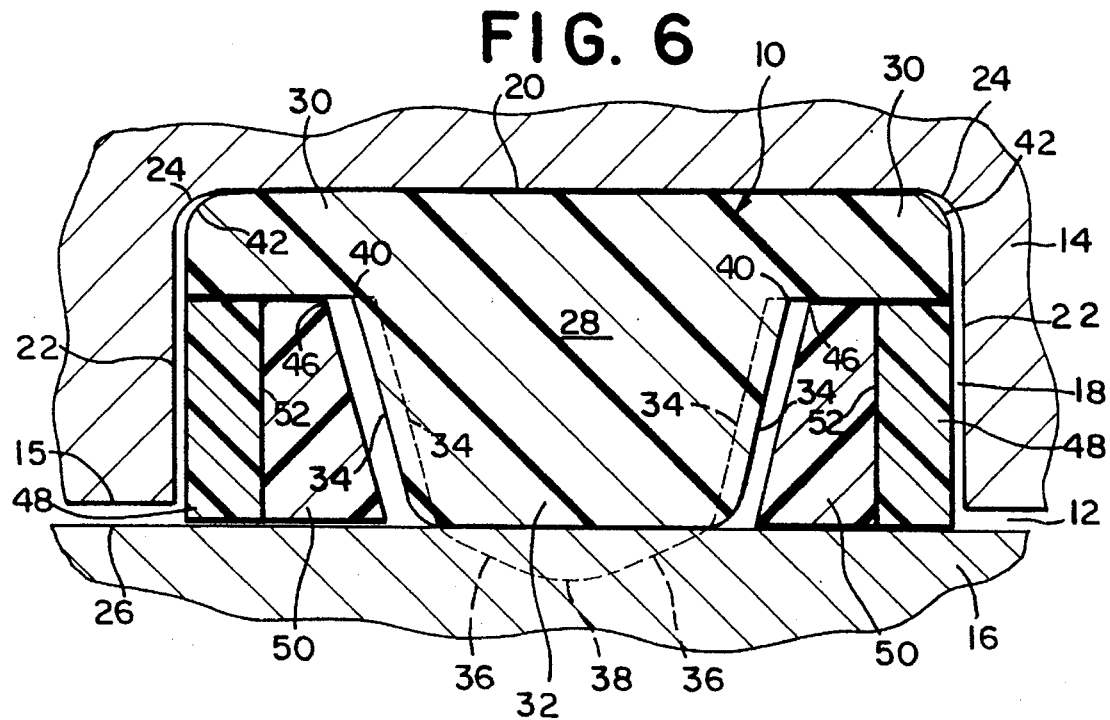
FIG. 6 is a greatly enlarged cross-sectional view of a sealing assembly in accordance with a fourth preferred embodiment of the present invention positioned between first and second members.

Referring now to FIG. 6, there is shown a fourth preferred embodiment of the sealing assembly 10. The sealing assembly 10 in accordance with the fourth preferred embodiment is generally identical to the sealing assembly 10 described above in connection with the third preferred embodiment, except that the anti-extrusion rings 44 include inboard and outboard rings 50, 48 as described above in connection with the second preferred embodiment. Operation of the sealing assembly 10 of the fourth preferred embodiment is generally identical to that described above in connection with the first preferred embodiment of sealing assembly 10.

The sealing assembly 10 of the present invention achieves the advantage of avoiding stress concentrations in the area where the radially extending leg 32 intersects with the axially extending leg 30. The stress concentrations are avoided due to the converging side surfaces 34 which expand the width of the radially extending leg 32 proximate the axially extending leg 30. As mentioned previously, the converging side surfaces 34 support the radially extending leg 32, thereby preventing the converging end surfaces 36 from rotating and rocking with respect to the second surface 26 which caused the stress concentration in the previous devices discussed above.

Further, by providing a generally arcuate transition surface between the converging end surfaces 36, the distal portion or crown of the radially extending leg 32 achieves sufficient contact area with the second surface 26 to provide a fluid-tight seal between the radially extending leg 32 and the second surface 26.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

We claim:

1. A sealing assembly for sealing a clearance space between a first generally cylindrical surface of a first member and a second generally cylindrical surface of a second member, said first member having a generally annular groove therein and the second surface of the second member overlying the groove, said groove being defined by a generally axial base surface and two generally radial side surfaces, said first and second members being axially displaceable with respect to each other, said seal assembly comprising:

a flexible generally annular sealing ring for being positioned within the groove, said ring having an axially extending leg for being positioned in engagement with the base surface and a radially extending leg intersecting said axially extending leg, said radially extending leg including opposing converging side surfaces proximate to the axially extending leg and opposing converging end surfaces distal from the axially extending leg, each side surface merging with a respective end surface at a merge point, said end surfaces being generally linear in cross section and merging into a generally arcuate transition surface when said ring is in an uncompressed state, said transition surface and at least a portion of said end surfaces for being in facing engagement with the second surface of the second member when said ring is in a compressed state, each merge point residing within the groove and away from the second surface when the ring is in the compressed state such that the second surface and a portion of each end surface adjacent the respective merge point define a lubricating pocket, at least one of the lubricating pockets for receiving sealed fluid to be supplied to the transition surface as lubricant as a result of axial displacement of the first and second members with respect to each other; and a complementary mating anti-extrusion ring for being positioned within the groove juxtaposed to each side surface and said radially extending leg.

2. The seal assembly as recited in claim 1 wherein said sealing ring is generally T-shaped in cross section.

3. The seal assembly as recited in claim 2, wherein said converging side surfaces arcuately merge into said converging end surfaces.

4. The seal assembly as recited in claim 1 wherein the sealing ring further includes generally arcuate transition surfaces between said converging side surfaces and said axially extending leg.

5. The seal assembly as recited in claim 1, wherein a portion of a least one of the converging side surfaces is for being in facing engagement with the second surface of the second member when said ring is in a compressed state.

6. The seal assembly as recited in claim 1, wherein each anti-extrusion ring is comprised of an outboard ring and an inboard ring, said inboard ring being positioned between said radially extending leg and said outboard ring, said outboard ring being constructed of a first material having a first modulus of elasticity, said inboard ring being constructed of a second material having a second modulus of elasticity, said first modulus of elasticity being greater than the second modulus of elasticity.

7. An apparatus comprising:

a first member having a generally annular groove and a first generally cylindrical surface, said groove being defined by a generally axial base surface and two generally radial side surfaces;

a second member having a second generally cylindrical surface overlying the groove, said first and second members being axially displaceable with respect to each other;

a flexible generally annular sealing ring positioned within the groove, said ring having an axially extending leg and a radially extending leg intersecting said axially extending leg, said axially extending leg being in engagement with said base surface, said radially extending leg including opposing converging side surfaces proximate to the axially extending leg and opposing converging end surfaces distal from the axially extending leg, each side surface merging with a respective end surface at a merge point, said end surfaces being generally linear in cross section and merging into a generally arcuate transition surface when said ring is in an uncompressed state, said transition surface and at least a portion of said end surfaces being in facing engagement with the second surface of the second member when said ring is in a compressed state, each merge point residing within the groove and away from the second surface when the ring is in the compressed state such that the second surface and a portion of each end surface adjacent the respective merge point define a lubricating pocket, at least one of the lubricating pockets for receiving sealed fluid to be supplied to the transition surface as lubricant as a result of axial displacement of the first and second members with respect to each other; and a complementary mating anti-extrusion ring positioned within the groove juxtaposed to each side surface and said radially extending leg.

8. The apparatus as recited in claim 7 wherein said sealing ring is generally T-shaped in cross section.

9. The apparatus as recited in claim 7 wherein said converging side surfaces arcuately merge into said converging end surfaces.

10. The apparatus as recited in claim 7 wherein the sealing ring further includes generally arcuate transition surfaces between said converging side surfaces and said axially extending leg.

11. The apparatus as recited in claim 7, wherein a portion of at least one of the converging side surfaces is in facing engagement with the second surface of the second member when said ring is in a compressed state.

12. The apparatus as recited in claim 7, wherein each anti-extrusion ring is comprised of an outboard ring and an inboard ring, said inboard ring being positioned between said radially extending leg and said outboard ring, said outboard ring being constructed of a first material having a first modulus of elasticity, said inboard ring being constructed of a second material having a second modulus of elasticity, said first modulus of elasticity being greater than the second modulus of elasticity.

* * * * *